United States Patent
Xu et al.

(10) Patent No.: US 6,989,997 B2
(45) Date of Patent: Jan. 24, 2006

(54) QUASI-RESONANT DC-DC CONVERTERS WITH REDUCED BODY DIODE LOSS

(75) Inventors: Ming Xu, Blacksburg, VA (US); Fred C. Lee, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 70 days.

(21) Appl. No.: 10/603,097

(22) Filed: Jun. 25, 2003

(65) Prior Publication Data

US 2004/0264214 A1 Dec. 30, 2004

(51) Int. Cl.
*H02M 3/335* (2006.01)
(52) U.S. Cl. ............... 363/16; 363/18; 323/271
(58) Field of Classification Search ............... 363/16, 363/97, 95, 98, 17, 20; 323/222, 225, 271, 323/282, 268, 284
See application file for complete search history.

(56) References Cited

U.S. PATENT DOCUMENTS

| | | | | |
|---|---|---|---|---|
| 5,067,066 A | * | 11/1991 | Chida | 363/16 |
| 5,663,635 A | * | 9/1997 | Vinciarelli et al. | 323/282 |
| 6,429,628 B2 | * | 8/2002 | Nakagawa | 323/224 |

* cited by examiner

*Primary Examiner*—Rajnikant B. Patel
(74) *Attorney, Agent, or Firm*—Whitham, Curtis & Christofferson, P.C.

(57) ABSTRACT

Buck converters having a resonant inductor Lr, resonant capacitor Cr, and synchronous switch Q3 that together provide reduced switching loss and soft switching. In operation, the resonant inductor Lr is charged during a time period A. Then, Lr is freewheeling and provides current to an output inductor Lo. Then, Q3 is turned OFF, and energy from the resonant inductor Lr charges the resonant capacitor Cr. Finally, energy from the resonant capacitor Cr is provided to the output inductor and load. The output power can be adjusted by phase control of the operation of switch Q3. In alternative embodiments, the circuit has a pair of coupled inductors L1 L2 or an isolation transformer 40. The coupled inductors have a polarity selected so that the output voltage is reduced, thereby allowing top switch Q1 to have a greater duty cycle. These circuits feature no body diode loss in the switch Q3.

36 Claims, 8 Drawing Sheets

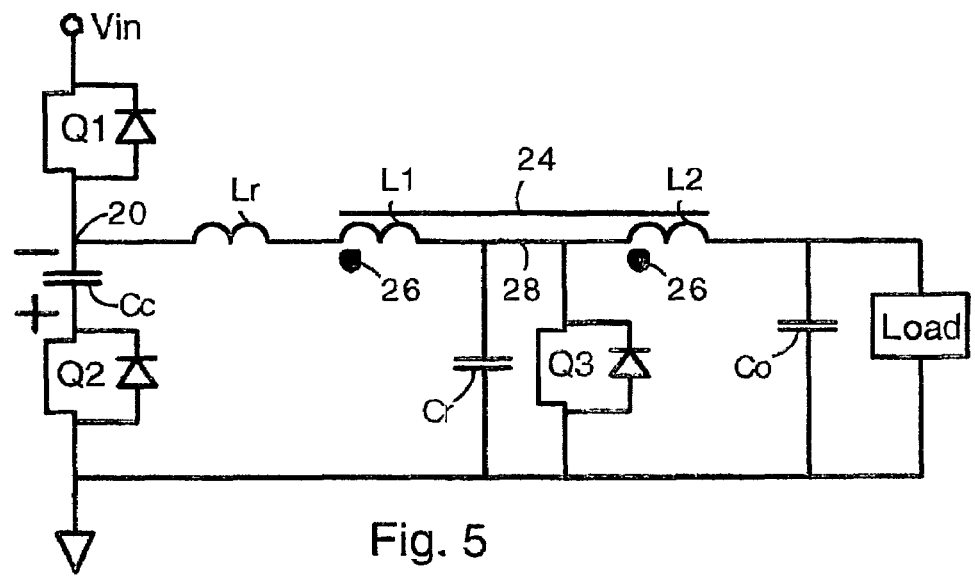
Fig. 5
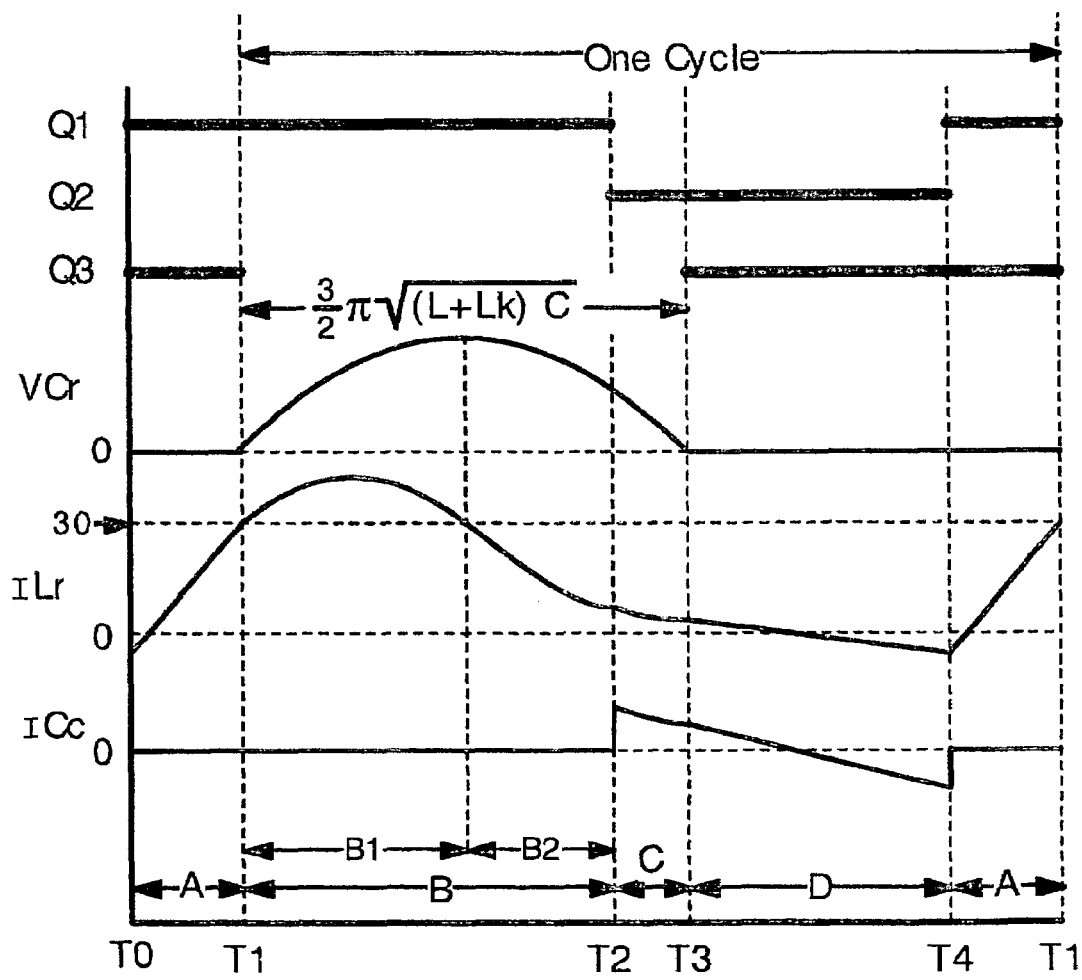
Fig. 6   Time

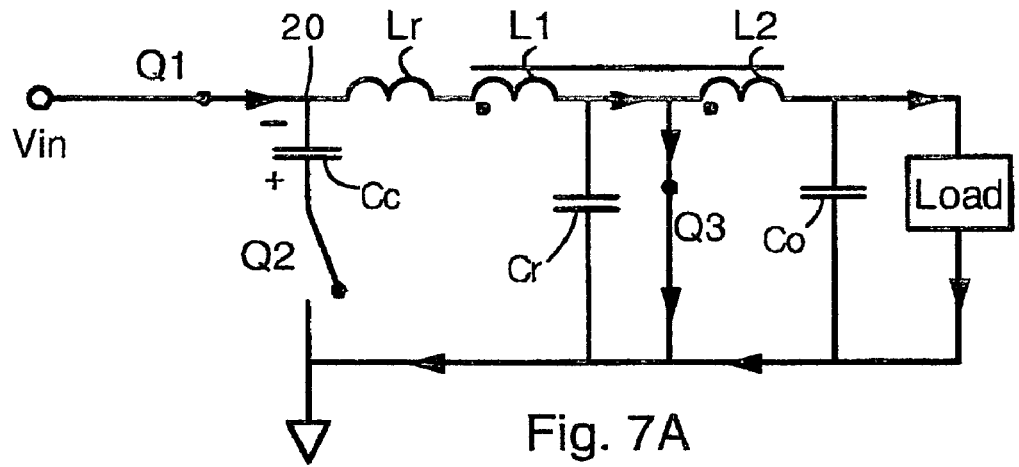
Fig. 7A
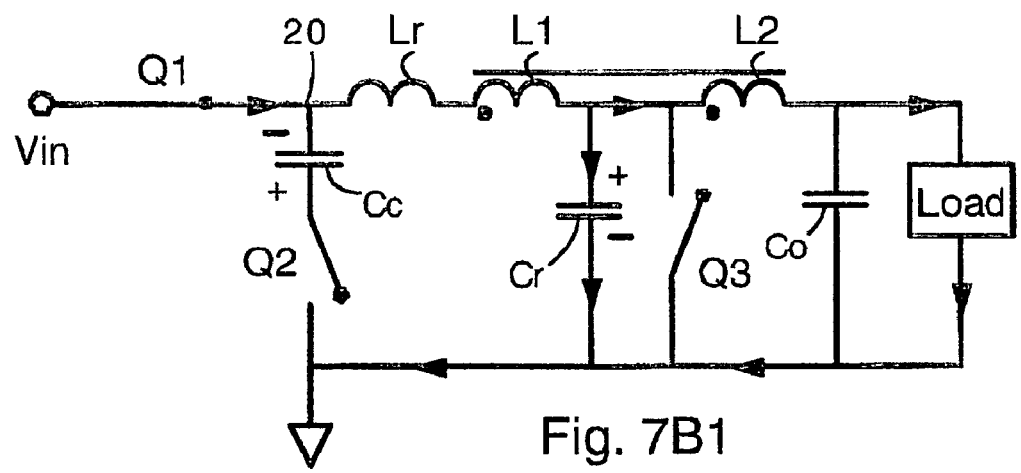
Fig. 7B1
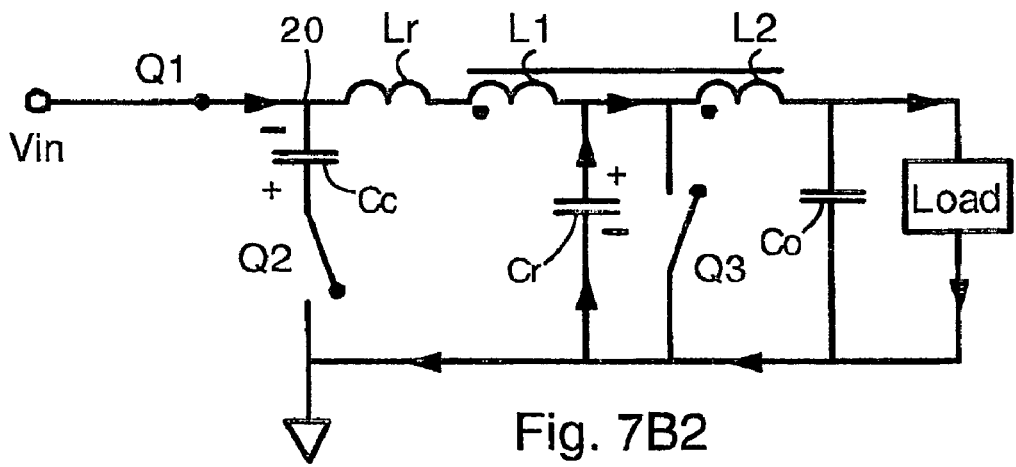
Fig. 7B2

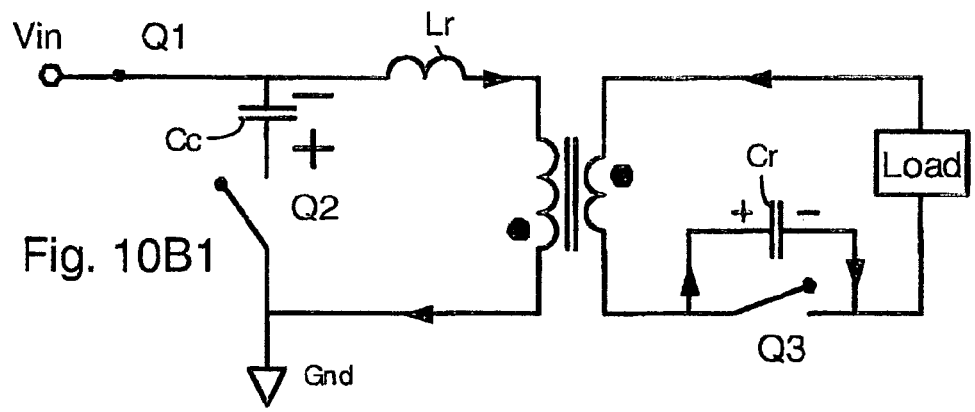
Fig. 10B1
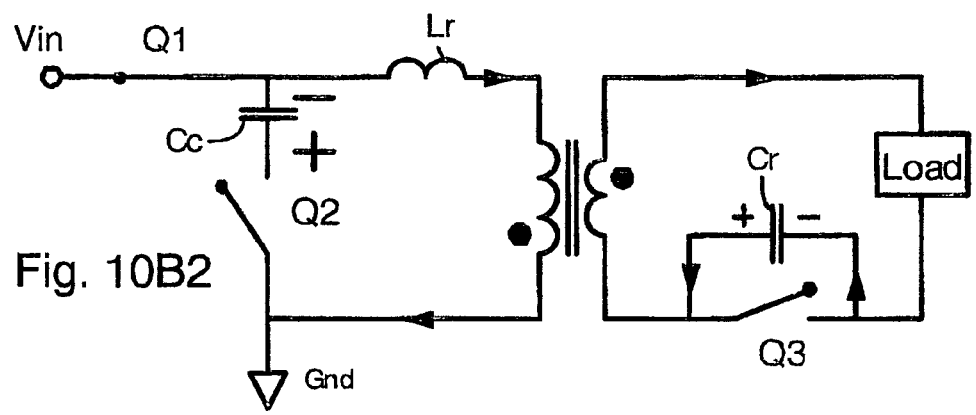
Fig. 10B2
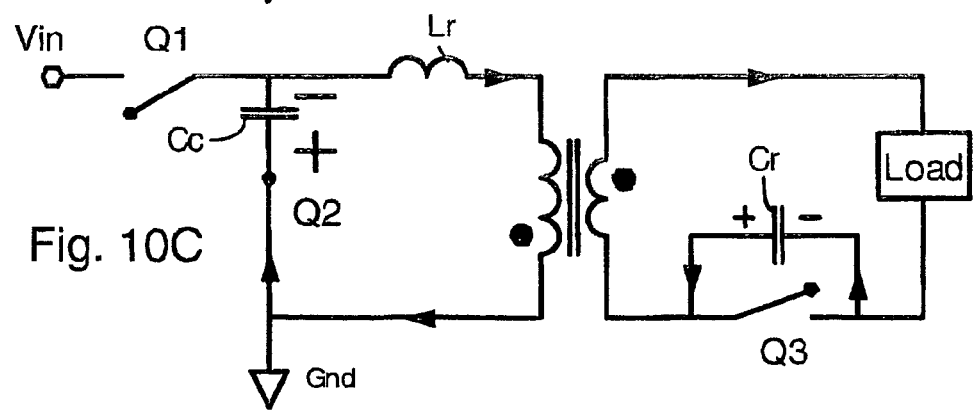
Fig. 10C
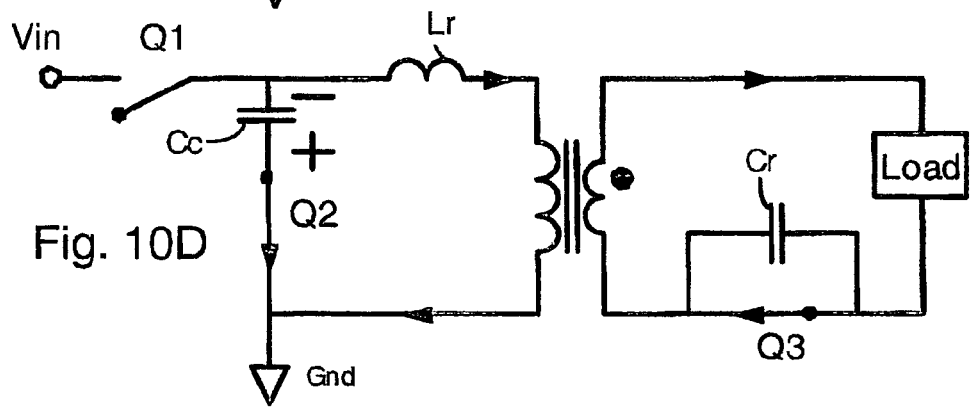
Fig. 10D

QUASI-RESONANT DC-DC CONVERTERS WITH REDUCED BODY DIODE LOSS

FIELD OF THE INVENTION

The present invention relates generally to electrical power supplies. More particularly, it relates to buck DC—DC converters having a resonant capacitor and resonant inductor that provide increased efficiency and reduced output voltage.

BACKGROUND OF THE INVENTION

Buck converters are commonly used in electronics for changing the voltage or polarity of a power supply. They are often used to provide low voltage, high current output power. Buck converters typically employ two electronic switches (typically MOSFETs) in combination with an output inductor. The switches are alternately turned on, thereby providing voltage pulses to the output inductor.

During portions (dead times) of the switching cycle, both switches are off. When both switches are off, the output inductor produces freewheeling current that flows through the integral body diode of one of the switches. Body diode current produces substantial energy loss due to the forward-bias voltage drop across the diode, thereby reducing the energy efficiency of the buck converter. Additionally, reverse recovery loss occurs when the body diode later becomes reverse-biased. In order to improve the efficiency of buck converters, body diode conduction and reverse recovery losses must be reduced.

In order to provide buck converters with small size and weight, and reduced cost, it is best to operate the buck converter at high frequency. However, energy loss from both body diode conduction and reverse recovery increase dramatically with increasing operating frequency. In this way, body diode conduction and reverse recovery tend to limit the maximum operating frequency of buck converters.

Also, state of the art microprocessors and digital electronics require exceptionally low supply voltages at high current. In order to provide such electrical power from a fixed-voltage DC supply, the power supply must have a greater voltage step-down ratio. However, a high voltage step-down ratio is typically accomplished by reducing the duty cycle of the buck switches, which tends to increase switching losses. The switching losses are also increased by high frequency operation.

Additionally, it is noted that conventional buck converters operate the switches in hard switching mode. That is, the switches are conducting current when they are turned off, and they have voltage applied when they are turned on. Hard switching results in large switching loss and reduced reliability of the switches. It would be an advance in the art of buck converter design to provide a buck converter that has soft switching or nearly-soft switching (i.e. zero- or low-voltage at turn-on, and zero- or low-current at turn off).

More generally, it would be an advance in the art of buck converter design to provide a buck converter having reduced switching loss, body diode current loss and soft switching. Such a buck converter could operate with very high efficiency compared to conventional buck converters, and could operate at high frequency. High frequency capability can provide many benefits such as smaller size and weight, and reduced cost.

SUMMARY OF THE INVENTION

The present invention includes a quasi-resonant buck converter having a top switch and an auxiliary switch connected in series between a power source Vin and a return potential Gnd. A resonant inductor is connected to a connection point between the top and auxiliary switches. A synchronous switch and resonant capacitor are connected between the resonant inductor and the return potential.

The operation of the synchronous switch can be phase shifted to control output power. The OFF time of the synchronous switch is preferably approximately equal to a resonant period of the resonant inductor and resonant capacitor, $$\frac{3}{2}\pi\sqrt{LC},$$

where L is the inductance of the resonant inductor, and C is the capacitance of the resonant capacitor.

In an alternative embodiment, the circuit has coupled inductors. The coupled inductors are connected in series and in series with the resonant inductor. The resonant capacitor and synchronous switch are connected to a midpoint of the coupled inductors. In this embodiment, the coupled inductors tend to reduce output voltage, and thereby allow a greater duty cycle and consequently, provide reduced switching losses and greater efficiency.

In this embodiment the resonant period is given by $$\frac{3}{2}\pi\sqrt{(L+Lk)C}$$

where L is the inductance of the resonant inductor, Lk is the leakage inductance of the primary coupled inductor, and C is the capacitance of the resonant capacitor. Preferably, the resonant half-period is in the range of about 0.05 to 5 microseconds. Also preferably, the circuit is controlled so that an OFF time of the synchronous switch is approximately equal to $$\frac{3}{2}\pi\sqrt{(L+Lk)C}.$$

The circuit can also include a controller for controlling the operation of the switches so that output power or output voltage can be set to a certain value, or varied. Control over output power and output voltage is provided by timing the operation of the switches.

In another embodiment of the invention, an isolation transformer is provided between the resonant inductor and the synchronous switch and resonant capacitor. The isolation transformer provides isolation between the input and output of the circuit.

In this embodiment the resonant period is given by $$\frac{3}{2}\pi\frac{N_s}{N_p}\sqrt{(L+L_k)C}$$

where L is the inductance of the resonant inductor, Lk is the leakage inductance of the transformer, C is the capacitance of the resonant capacitor, $N_s$ is the number of turns in the transformer secondary winding, and $N_p$ is the number of turns in the transformer primary winding. Preferably, the resonant period is in the range of about 0.05 to 5 microseconds. Also preferably, the circuit is controlled so that an OFF time of the synchronous switch is approximately equal to the resonant period $$\frac{3}{2}\pi \frac{N_s}{N_p}\sqrt{(L+L_k)C}.$$

The transformer-isolated circuit can also include a controller for controlling the operation of the switches so that output power or output voltage can be set to a certain value, or varied. Control over output power and output voltage is provided by timing the operation of the switches.

DESCRIPTION OF THE FIGURES

FIG. 5 shows a quasi-resonant tap-buck converter according to the present invention.

FIG. 6 shows a timing diagram for operating the quasi-resonant tap-buck converter of FIG. 5.

FIGS. 7A–7D illustrate circuit conditions for the circuit of FIG. 5 during the time periods A, B1, B2, C, and D of FIG. 6.

FIGS. 10A–10D illustrate circuit conditions for the circuit of FIG. 8 during time periods A, B1, B2, C, and D of FIG. 9.

DETAILED DESCRIPTION OF THE PREFERRED EMBODIMENTS

The present invention provides a buck converter having a resonant capacitor and resonant inductor. In operation, the resonant capacitor and inductor apply voltage and current across the switches so that soft switching (or nearly-soft switching) is provided. Also, the resonant capacitor and resonant inductor help to transfer output power. Body diode current loss is reduced in the present buck converters. Specifically, the resonant capacitor and resonant inductor apply a reverse current through the body diodes of the buck switches at turn-on so that zero-voltage switching (ZVS) is provided. Also, the resonant capacitor and inductor oppose current flow through buck switches at turn-off so that near-zero current switching (ZCS) is provided. Also, in one embodiment, a coupled inductor provides for reduced output voltage even with relatively high duty cycle. Additionally, an isolated embodiment is provided.

Figure 1:
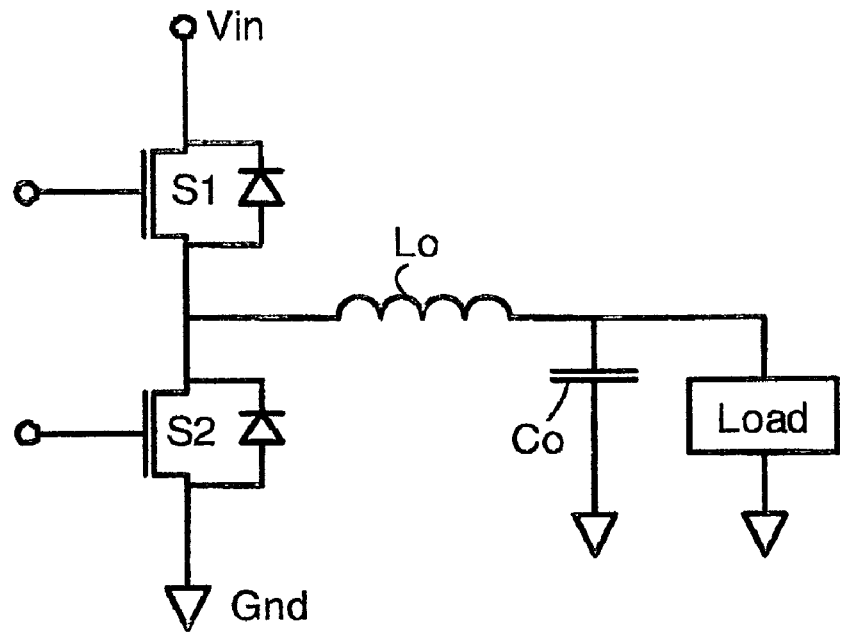
FIG. 1 (Prior Art) shows a conventional buck converter according to the prior art.

FIG. 1 shows a buck converter according to the prior art. The buck converter has switches S1 S2 connected between Vin and Gnd. Gnd is the return potential for Vin; Gnd does not have to be Earth ground. An output inductor Lo and output capacitor Co provide filtering for the power provided to the load. In operation, both switches S1 and S2 experience hard switching at turn-on and turn-off, which produces switching loss. The switching loss increases rapidly with operating frequency. Additionally, during a dead time after S1 turn-off and before S1 turn-on, the body diode of S2 will conduct current due to the freewheeling output inductor Lo, resulting in energy loss and reverse recovery loss. The energy loss of S2 body diode current increases rapidly with operating frequency. These shortcomings render the device of FIG. 1 unpreferable for use in applications requiring high operating frequency, low output voltage and high output current.

Figure 2:
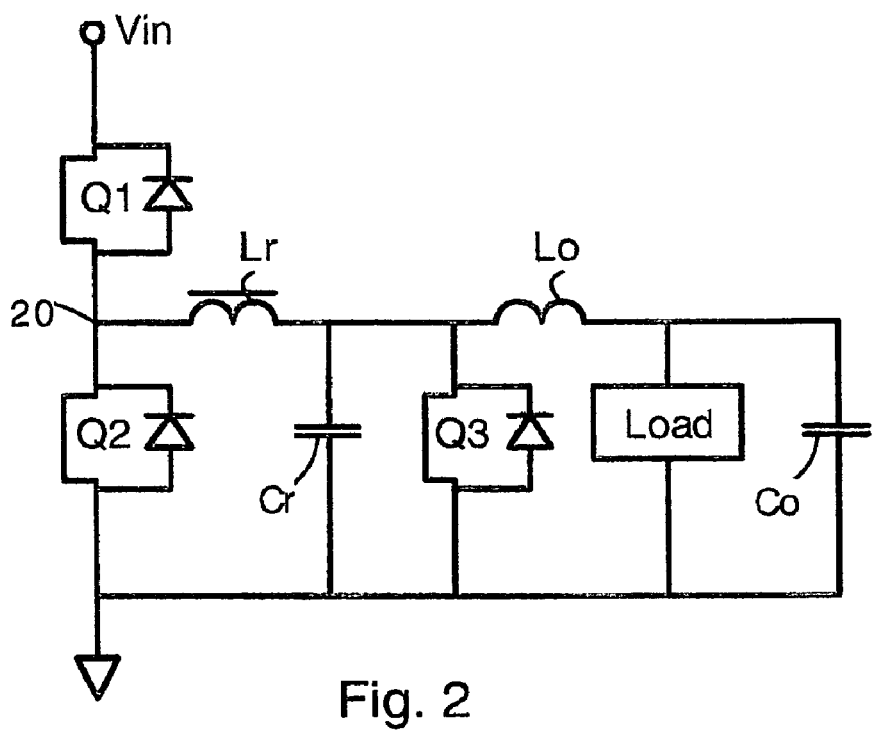
FIG. 2 shows a quasi-resonant buck converter according to the present invention.

FIG. 2 shows a quasi-resonant buck converter according to the present invention. The quasi-resonant buck of FIG. 2 has a top switch Q1 and an auxiliary switch Q2 connected across Vin and Gnd (Vin is positive in the specific embodiment shown). The top switch Q1 and auxiliary switch Q2 are connected at a connection point 20. A resonant inductor Lr is connected to the connection point. A resonant capacitor Cr is connected between the resonant inductor and Gnd. A synchronous switch Q3 is connected in parallel with the resonant capacitor Cr. An output inductor Lo and a Load are connected in series across the synchronous switch Q3. An output capacitor Co is connected in parallel with the Load.

Preferably, the switches Q1 Q2 Q3 are low on-resistance power MOSFETs or a similar kind of electronically controlled switch. The switches Q1 Q2 Q3 have gates (not shown) which are controlled by a gate controller (not shown) for turning the switches Q1 Q2 Q3 ON and OFF, as known in the art. Alternatively, switches Q1 Q2 Q3 can be insulated gate bipolar transistors (IGBTs) or bipolar transistors, which may be preferred in high voltage or high power applications.

The resonant inductor Lr and output inductor Lo may have magnetic cores made of ferrite, for example.

The load can be a microprocessor, digital electronics, communication electronics or any device that requires voltage lower than Vin.

The power supply Vin can be positive (as in FIG. 2) or negative.

Figure 3:
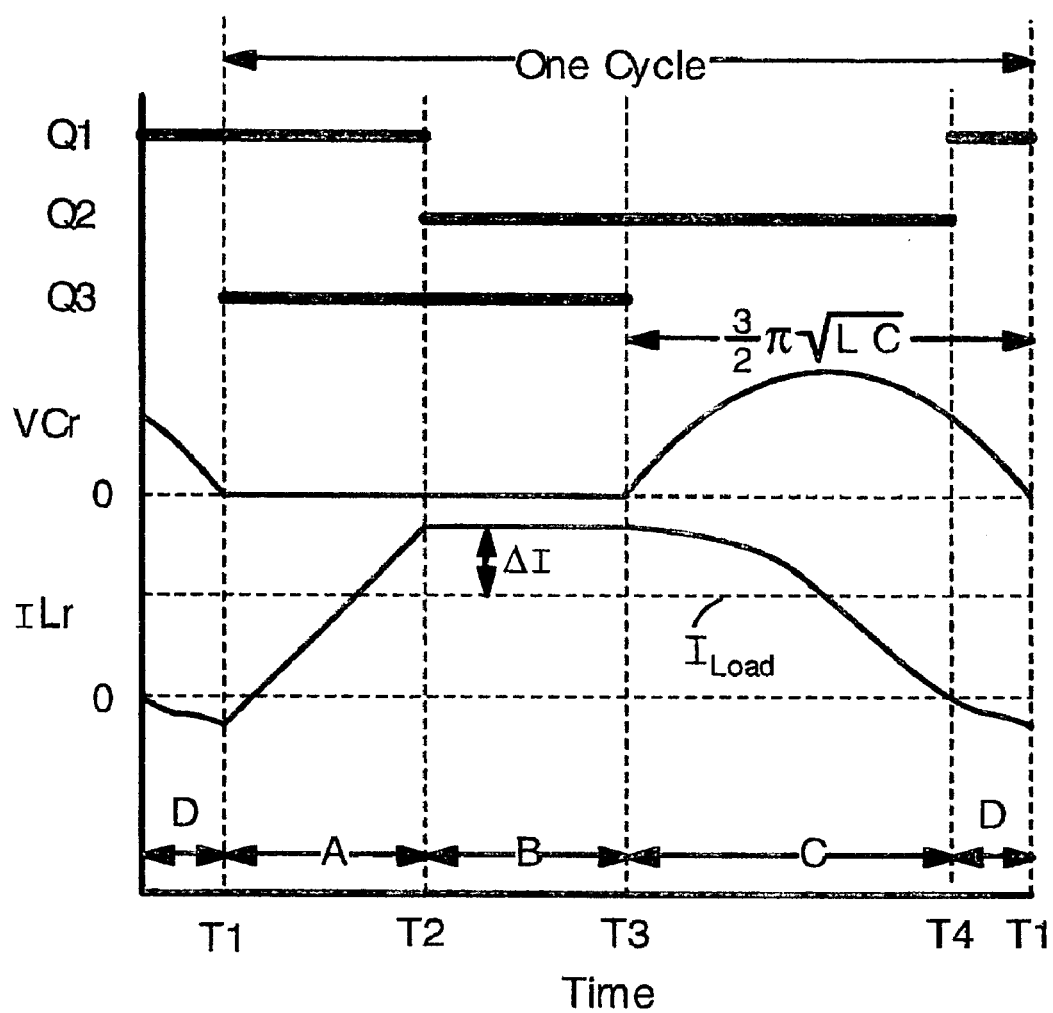
FIG. 3 shows a timing diagram illustrating operation of the circuit of FIG. 2.

FIG. 3 shows a timing diagram for operating the quasi-resonant buck converter of FIG. 2. Dark horizontal lines indicate when switches Q1 Q2 Q3 are ON. One full cycle of operation is divided into four time periods A B C and D. The durations of time periods A B C and D are not necessarily equal; the durations can be adjusted to provide a desired output power and output voltage, as explained below. The time period boundaries are indicated by transitions T1 T2 T3 T4. It is noted that at transitions T2 and T4 there will be a short (e.g. tens of nanoseconds or less) dead times so that switches Q1 and Q2 are never ON at the same time. Also illustrated in FIG. 3 are the voltage across the resonant capacitor Cr ($V_{Cr}$) and the current through inductor Lr. ($I_{Lr}$).

FIGS. 4A–4D illustrate circuit conditions during time periods A–D, respectively. FIGS. 4A–4D are explained below. Arrows in the circuit illustrations indicate the direction of current flow. For brevity, the output capacitor Co is not illustrated.

Figure 4A:
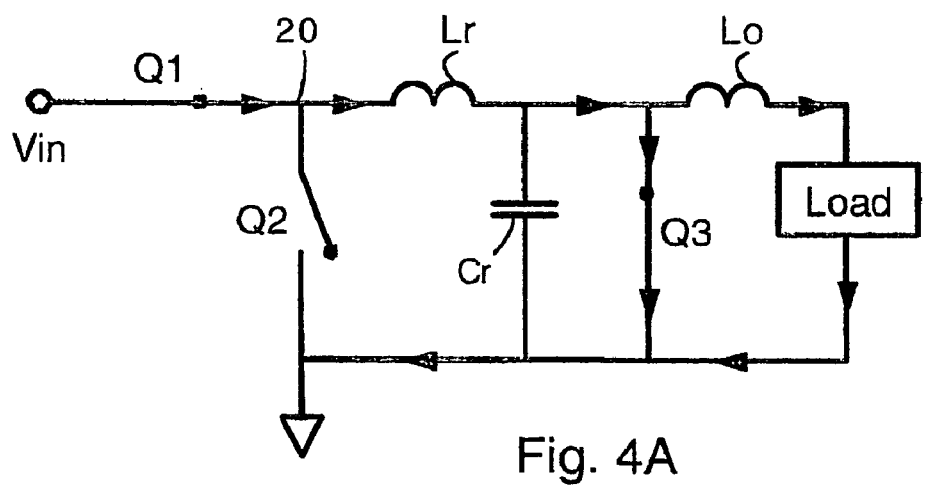
FIGS. 4A–4D illustrate circuit conditions during the four time periods A, B, C and D of FIG. 3.

FIG. 4A (Time period A): Q1 and Q3 ON, and Q2 are OFF. Current from Vin rises linearly and charges resonant inductor Lr. Output inductor Lo is freewheeling. It is noted that essentially all of the energy supplied by Vin during time period A is stored in the resonant inductor Lr. It is also noted that the current through resonant inductor Lr should rise to a level greater (e.g. 10–100% greater) than the Load current $I_{load}$, illustrated in FIG. 3 by a horizontal line. Time period A is a charging period and so the duration of time period A determines the output power provided to the load. More specifically, the overlapping ON time of switches Q1 and Q3 determines the output power. In other words, increasing the duration of time period A increases the output power.

Figure 4B:
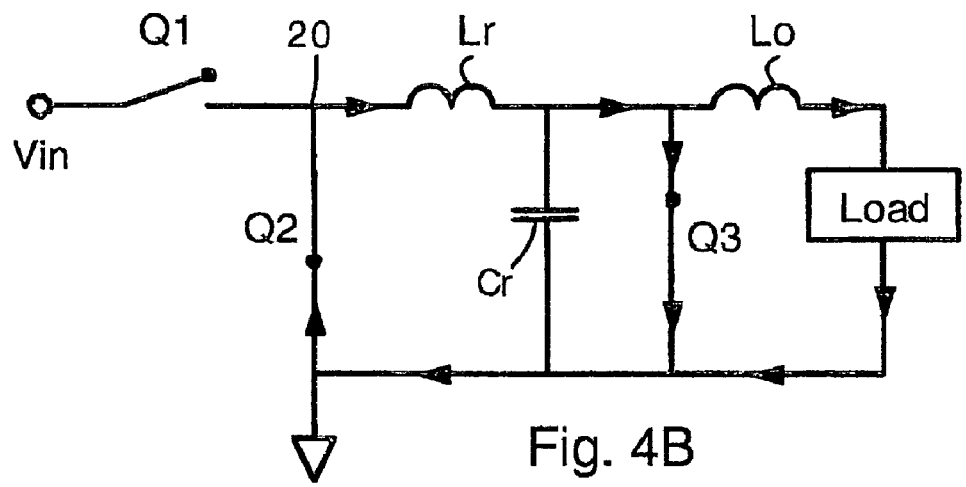

FIG. 4B (Time period B): Q1 is OFF, and Q2 and Q3 are ON. Resonant inductor Lr and output inductor Lo are both freewheeling. Freewheeling current from Lr flows through switches Q3 and Q2, but not into the Load. Current through Lr remains essentially constant. The current flowing through Q3 is equal to ΔI (ΔI=$I_{Lr}$−$I_{Load}$), since freewheeling currents from Lr and Lo flow through Q3 in opposite directions.

Figure 4C:
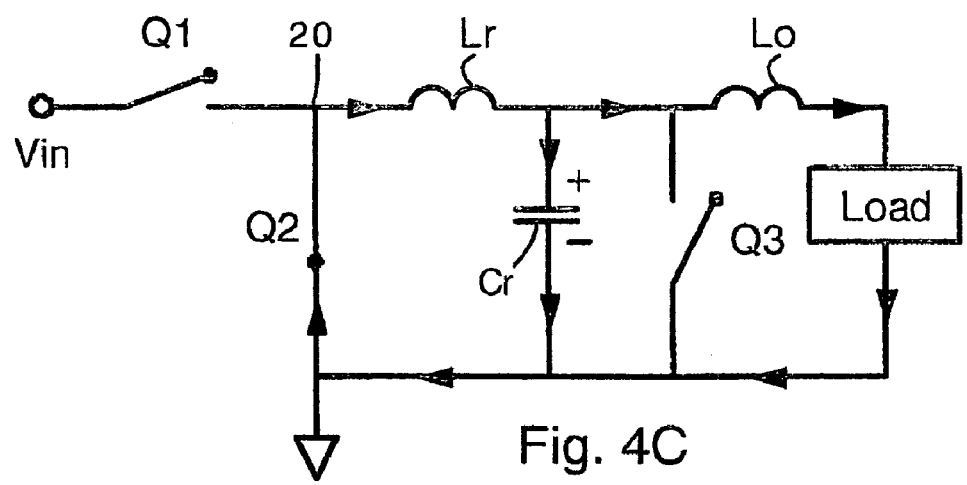

FIG. 4C (Time period C): Q1 and Q3 are OFF, and Q2 is ON. Freewheeling current from resonant inductor Lr flows into the resonant capacitor Cr and also flows through output inductor Lo into the load. Resonant inductor current $I_{Lr}$ is equal to $I_{load}$ when $V_{Cr}$ is at a maximum. When resonant inductor current $I_{Lr}$ is below $I_{load}$, resonant capacitor is providing power to the load and output inductor Lo. The current through the resonant inductor Lr decreases rapidly as it is discharged. Resonant inductor current is approximately zero (or slightly negative) at transition T4.

Figure 4D:
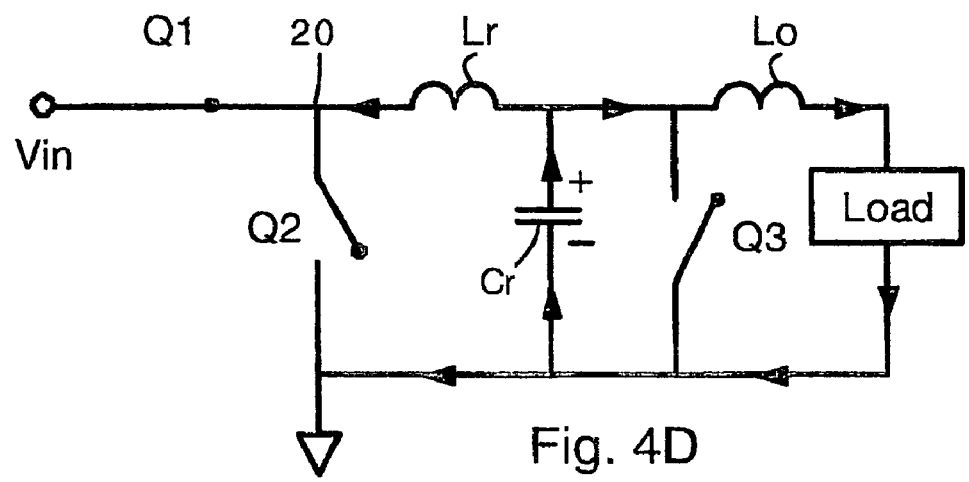

FIG. 4D (Time period D): Q1 is ON, and Q2 and Q3 are OFF. Resonant capacitor Cr continues discharging through the load and through the resonant inductor Lr. Most current from the resonant capacitor Cr flows to the load. A small amount of current from Cr flows through the resonant inductor and into Vin, the power source. This results in a small, negative resonant inductor current during period D.

It is noted in the invention that the time periods C and D (the OFF time of switch Q3) preferably have a combined duration of approximately $$\frac{3}{2}\pi\sqrt{LC},$$

where L is the inductance of the resonant inductor Lr and C is the capacitance of the resonant capacitor Cr. Hence, for a given circuit with fixed values of L and C, the duration of the combined periods C and D is fixed. Fixing the duration of the combined C and D time periods assures that the voltage on the capacitor is zero, or near-zero when synchronous switch Q3 is turned on (i.e. switch Q3 has zero voltage switching, or ZVS).

Exemplary values for the capacitance of the resonant capacitor Cr can be 0.01–1 microFarad. Exemplary values for the inductance of the resonant inductor Lr can be 1–100 nanoHenries. Typical values can be about 0.1 μF and 20 nH for operation at about 1 Mhz. Also, it is noted that resonant inductor Lr should have an inductance that is much less (e.g. less than 1/10) than the value of the output inductor Lo.

The output power can be controlled in the invention by changing the turn-on time of Q3 relative to the turn-off time of Q1 (i.e. changing the duration of period A, when both Q1 and Q3 are ON). Specifically, the output power is increased as the duration of time period A is increased. However, since the duration of time periods C+D is fixed at $$\frac{3}{2}\pi\sqrt{LC}$$

for a given circuit, the output power should be adjusted by phase shifting the control of Q3 relative to Q1 and Q2. In other words, power output should be controlled in a given circuit by delaying transitions T1 and T3 by the same amount. This will keep unchanged the sum of the durations of time periods C and D.

The ratio of output voltage (Vo) to input voltage (Vin) can be adjusted in the invention by varying the combined duration of time periods A and D. Increasing the combined duration A+D will increase the ratio of Vo/Vin. For a fixed input voltage, output voltage can be increased by increasing the combined duration of periods A and D.

Also, it is significant in the invention that all switches Q1 Q2 Q3 have zero voltage switching (ZVS), or near-ZVS, at turn-on. For Q1, ZVS is provided because the resonant capacitor Cr provides reverse current direction through Lr and Q1 before Q1 is turned on and while Q1 is being turned on. For Q2, ZVS is provided because the body diode of Q2 conducts during the dead time associated with transition T2. For Q3, ZVS is provided because Q3 is turned on when the capacitor is completely discharged, or nearly so. Hence, the present invention provides ZVS for all the switches, and this feature helps to increase efficiency, maximum operating frequency, and reliability.

Also, switches Q2 and Q3 experience near-zero current (zero-current switching, or ZCS) at turn-off. Switch Q2 experiences near-ZCS since Q2 is turned off at transition T4. Q3 experiences near-ZCS since it is turned off at or close to the time when the current through resonant inductor Lr and output inductor Lo is equal (see transition T3 in FIG. 3.). Switch Q1, however, has a high current at turnoff (transition T2), and so experiences hard switching at turn-off.

Accurately ZCS can be difficult to achieve in the invention because it requires precise timing control that may not be available. However, in the present invention switches Q2 Q3 have very low currents at switch turn-off compared to the prior art. For example, the current at turnoff of switches Q2 and Q3 can be about 5–20% of the output current Io. So, although the present invention may not provide exactly zero current at turnoff for switches Q2 and Q3, the turnoff current is low enough to provide the benefits of ZCS.

Compared to the prior art DC—DC buck converters, the ZVS (for switches Q1 Q2 Q3) and near-ZCS condition (for switches Q2 and Q3) provides increased efficiency and improved reliability for the present quasi-resonant buck converter. ZVS and ZCS are also known in the art as "soft switching". The switching loss for the present quasi-resonant buck converter is much less than the switching loss in prior art, hard-switched buck converters. In addition, the body diode loss of the synchronous rectifier switch Q3 has been eliminated.

FIG. 5 shows a second embodiment according to the present invention. Specifically, the second embodiment is a quasi-resonant tap-buck converter. The quasi-resonant tap-buck converter has the top switch Q1, auxiliary switch Q2, synchronous switch Q3, resonant capacitor Cr and the resonant inductor Lr. Also, a pair of coupled inductors L1 L2 are connected between the resonant inductor Lr and Load. The coupled inductors L1 L2 are preferably coupled by a magnetic core 24 (e.g. made of ferrite). A clamping capacitor Cc is connected between the auxiliary switch Q2 and the connection point 20. The synchronous switch Q3 and resonant capacitor Cr are connected to Gnd and to a midpoint 28 between the coupled inductors L1 L2. Also, an output capacitor Co is provided in parallel with the Load.

The coupled inductors L1 L2 have a parallel polarity, indicated by the black dots. That is, 'parallel polarity' means that black dots 26 are both on the same side (left side in FIG. 5) of the inductors L1 L2. This polarity relationship between L1 and L2 tends to reduce the output voltage, which is desirable in a large voltage step-down application. For example, if the primary/secondary (Np:Ns) turns ratio is 1:1, then the output voltage will be reduced by about 50%. A 1:1 turns ratio will allow the top switch Q1 to operate with 2-fold greater duty cycle than otherwise possible. This is beneficial because a greater duty cycle for Q1 tends to reduce the switching losses and increase power efficiency.

The Np:Ns turns ratio of the coupled inductors can be varied widely. For example, the turns ratio can be 5:1 or 1:5, or anything in between. A high turns ratio (e.g. 2:1, 3:1) tends to provide a low output voltage. Hence, in order to provide a low output voltage and high duty cycle for Q1, the turns ratio is preferably 1:1 or higher (e.g. 2:1 or 3:1).

The coupled inductors should also have a small magnetizing inductance. This can be provided by an airgap in the magnetic core 24. Also, the leakage inductance of the coupled inductors should be as small as possible.

The clamping capacitor Cc functions as a voltage clamp, and has a relatively constant voltage during operation (voltage polarity indicated in FIG. 5 for the case of a positive input voltage). The clamping capacitor should therefore have as large a capacitance as possible. For example, the clamping capacitor can have a capacitance value in the range of 0.1–100 µF.

FIG. 6 shows a timing diagram for operating the tap-buck converter of FIG. 5. One full cycle is divided into time periods A, B, C and D. The operation of switches Q1 Q2 and Q3 is a little different compared to the quasi-resonant buck of FIG. 2. As before, however, a short dead time is provided at transitions T2 and T4 so that Q1 and Q2 are never ON at the same time. Also shown in FIG. 6 are the current through the resonant inductor Lr ($I_{L_r}$), the voltage across the resonant capacitor Cr ($V_{C_r}$), and the current through the clamping capacitor Cc ($I_{C_c}$). Also indicated in FIG. 6 at horizontal line 30 is the quantity $$I_o \times \left( \frac{V_o \times N_P + N_S \times V_{in}}{V_{in}} \right) \times \frac{1}{N_P + N_S},$$

which has units of current. This quantity of current is important in the quasi-resonant tap-buck circuit in that it indicates when synchronous switch Q3 should be turned OFF. Specifically, when the current through Lr is equal to the above equation, the combined current through Cr and Q3 is equal to zero. This aspect is explained in detail below.

FIGS. 7A–7D illustrate circuit conditions during time periods A–D, respectively. FIGS. 7A–7D are explained below. Arrows in the circuit illustrations indicate the direction of current flow.

FIG. 7A (Time period A) Switches Q1 and Q3 are ON, and Q2 is OFF. Since both Q1 and Q3 are ON, The entire input voltage Vin is applied across resonant inductor Lr and primary inductor L1. The current through the resonant inductor Lr and primary inductor L1 rises linearly, as seen in FIG. 6. The current represents stored energy in the resonant inductor Lr. Output voltage is applied across the secondary winding L2.

FIGS. 7B1 and 7B2 (Time periods B1 and B2) Q1 is ON, Q2 and Q3 are OFF. When Q3 is turned OFF, current from primary inductor L1 and resonant inductor Lr begins to charge the resonant capacitor Cr. Preferably, Q3 is turned OFF when current through primary inductor L1 is equal to, or slightly higher than the current level illustrated by line 30 in FIG. 6 and expressed in the equation above. During time period B2 (FIG. 7B2), capacitor Cr begins to discharge through L2 and the load.

Figure 7C:
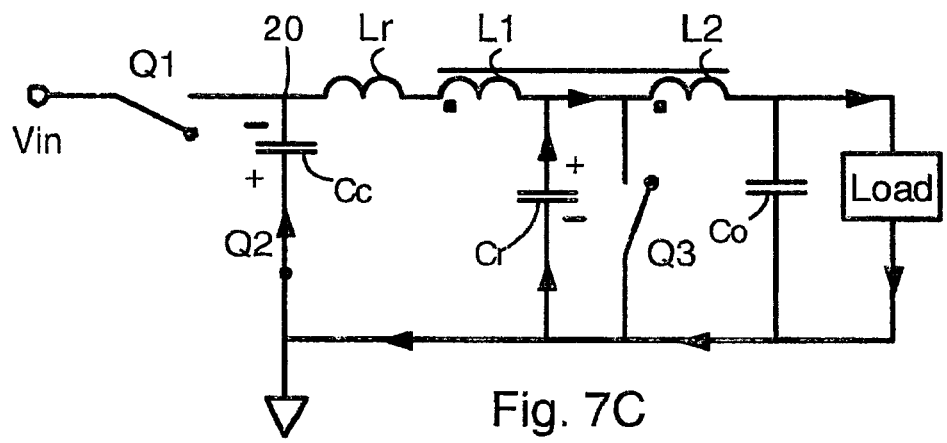

FIG. 7C (Time period C) Q2 is ON, and Q1 and Q3 are OFF. Capacitor Cr continues to discharge, and provides energy to the load and to clamping capacitor Cc as it discharges. This causes a current pulse through the clamping capacitor.

Figure 7D:
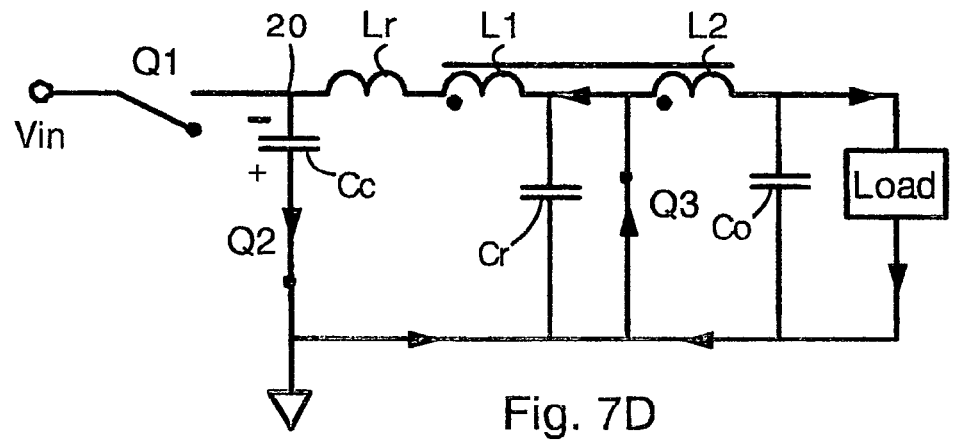

FIG. 7D (Time period D) Q2 and Q3 are ON, and Q1 is OFF. Synchronous switch Q3 is turned ON when voltage on the resonant capacitor Cr reaches zero. Voltage on the clamping capacitor causes a reverse current flow through the resonant inductor Lr. FIG. 7D illustrates the current flow in the latter portion of time period D, after current flow through Cc has reversed.

It is noted that the combined duration of time periods B and C (equal to the OFF time of the synchronous switch Q3) is preferably approximately $$\frac{3}{2} \pi \sqrt{(L + L_k)C},$$

where L is the inductance of the resonant inductor Lr, $L_k$ is the leakage inductance of primary winding L1, and C is the capacitance of the resonant capacitor Cr. Preferably, the leakage inductance $L_k$ is as small as possible. Hence, for a given circuit with fixed values of L, $L_k$, and C, the duration of the combined periods B and C is fixed. Fixing the duration of the combined B and C time periods assures that the voltage on the resonant capacitor is zero, or near-zero when synchronous switch Q3 is turned on (i.e. switch Q3 has zero voltage switching, or ZVS).

In the resonant tap-buck converter of FIG. 5, ZVS and near-ZCS are provided at turn on and turn off for all switches Q1 Q2 Q3 in a manner similar to the device of FIG. 2. Current through Q1 at turn off is very small.

The output power can be controlled in the circuit of FIG. 5 by changing the time of transition T4 (Q2 turnoff and Q1 turn on) relative to the time of transition T1 (i.e. changing the duration of period A, when both Q1 and Q3 are ON). Specifically, the output power is increased as the duration of time period A is increased.

The ratio of output voltage to input voltage (Vo/Vin) can be adjusted in the tap-buck embodiment by varying the combined duration of time periods A and B. Increasing the combined duration A+B will increase the ratio of Vo/Vin. For a fixed input voltage, output voltage can be increased by increasing the combined duration of periods A and B.

The quasi-resonant tap-buck converter of FIG. 5 can have a higher duty cycle than the quasi-resonant buck converter of FIG. 2. As a result, the quasi-resonant tap-buck will tend to have a higher efficiency (from reduced conduction loss and lower switching loss), and can have a higher operating frequency. The higher duty cycle is provided by the coupled inductors L1 L2, which tend to reduce the output voltage.

Figure 8:
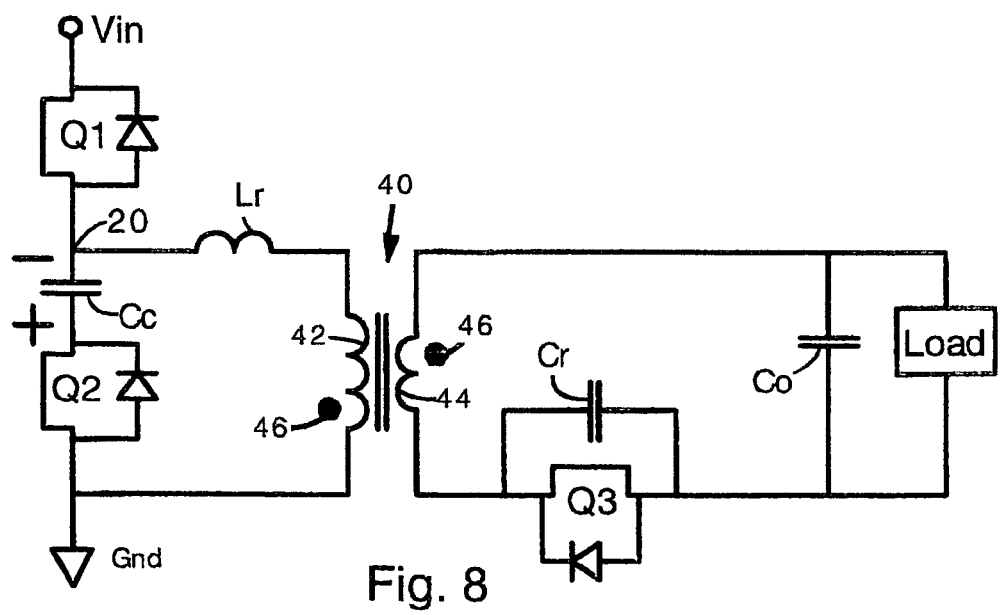
FIG. 8 shows a transformer-isolated quasi-resonant converter according to the present invention.

FIG. 8 shows an embodiment of the invention providing isolation between the input and output. Like the resonant tap-buck embodiment of FIG. 5, the device of FIG. 8 has the connection point 20, the top switch Q1, the auxiliary switch Q2, the clamping capacitor Cc, the resonant inductor Lr, the synchronous switch Q3, and the resonant capacitor Cr. The circuit also has an isolation transformer 40 connected between the resonant inductor, and the synchronous switch Q3 and resonant capacitor Cr. The isolation transformer 40 has a primary winding 42 and a secondary winding 44. The primary winding 42 is connected between the resonant inductor Lr and the return potential Gnd. The secondary winding 44 is connected in series with the synchronous switch Q3 and resonant capacitor Cr. The Load is also connected in series with the secondary winding and synchronous switch Q3, and the output capacitor Co is connected in parallel with the Load.

Dots 46 illustrate the preferred polarity of the transformer windings. If the polarity of the transformed is reversed, then the polarity of the synchronous switch should also be reversed.

The transformer can be a step-up or step-down transformer. In most applications, the transformer will be a step-down transformer, and will thereby serve to provide low-voltage, high current output power. The transformer can have a primary:secondary turns ratio in a wide range, for example in the range of 5:1 to 1:5.

Figure 9:
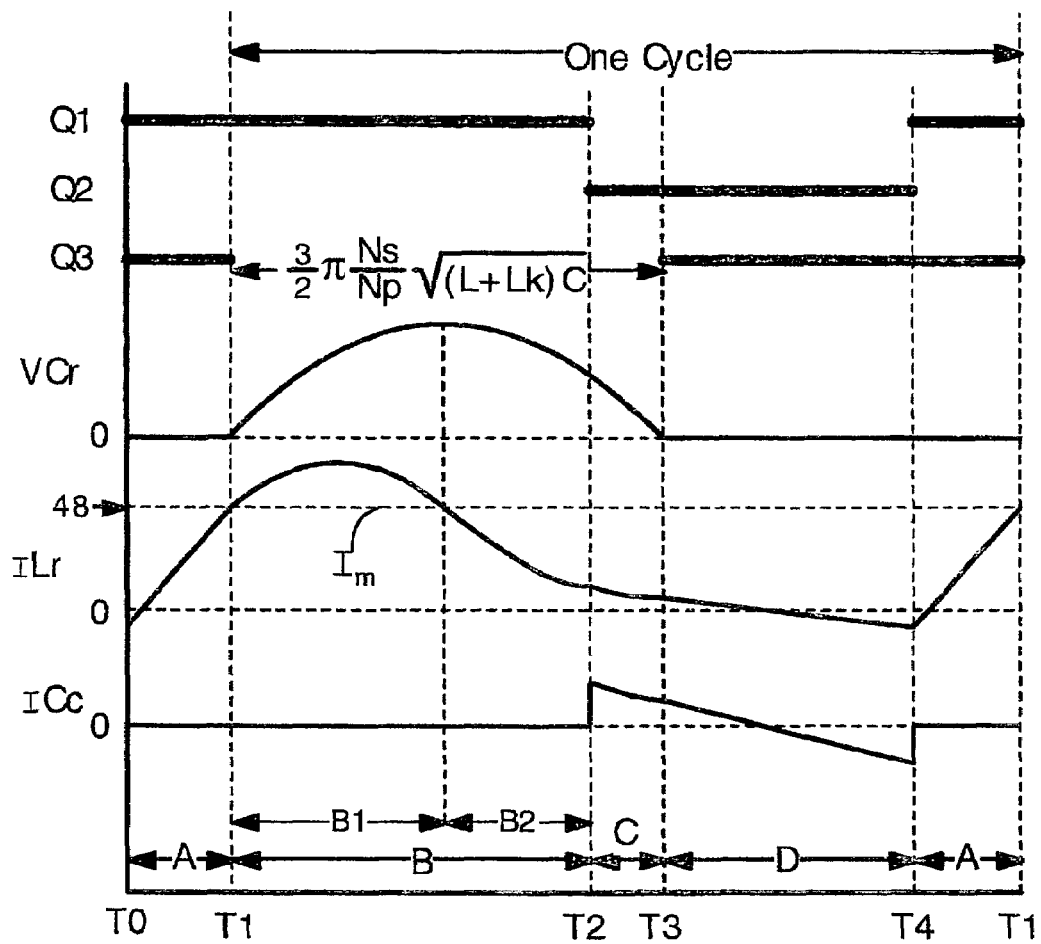
FIG. 9 shows a timing diagram for operating the circuit of FIG. 8.

FIG. 9 shows a timing diagram illustrating the operation of the isolated circuit of FIG. 8. The operation of the isolated circuit is very similar to the resonant tap-buck circuit of FIG. 5. For example the control of switches Q1 Q2 and Q3 is the same. However, there are at least a few key differences between the resonant tap buck of FIG. 5, and the transformer-isolated circuit of FIG. 8: (1) at T1, synchronous switch Q3 is turned OFF when the resonant inductor Lr current is approximately equal to the magnetization current Lm indicated at 48, instead of the current level indicated at 30 (2) the combined duration of time periods B+C is dependent upon the transformer turns ratio.

FIGS. 10A–10D illustrate circuit conditions during time periods A–D, respectively. FIGS. 10A–10D are explained below. For brevity, the optional output capacitor Co is not shown. Arrows in the circuit illustrations indicate the direction of current flow.

Figure 10A:
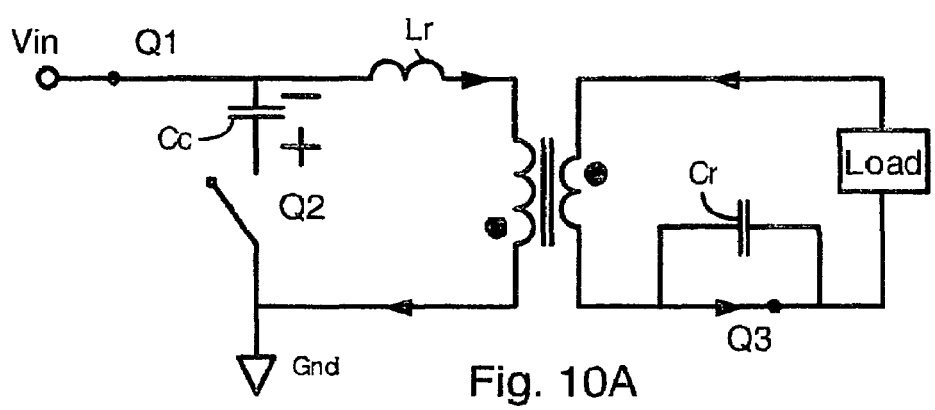

FIG. 10A (time period A) Switches Q1 and Q3 are ON, switch Q2 is OFF. The voltage difference between Vin and the output voltage is applied across resonant inductor Lr. Current through the resonant inductor Lr and transformer primary 42 rises linearly, thereby storing energy in the resonant inductor Lr. The rising current also induces current in the transformer secondary 44, which is provided to the Load. The duration of time period A, and the amount of energy stored in resonant inductor Lr, determines the output power.

FIG. 10B1 (time period B1) Switch Q1 is ON, and switches Q2 and Q3 are OFF. The resonant capacitor Cr is charged by the difference in current between resonant inductor Lr and magnetizing current In of the transformer. Preferably, synchronous switch Q3 is turned OFF when the current through Lr is equal to, or slightly greater than the magnetizing current Im, indicated by horizontal line 48 in FIG. 9.

FIG. 10B2 (time period B2) Switch Q1 is ON, and switches Q2 and Q3 are OFF. Voltage on the resonant capacitor Cr peaks as resonant inductor current falls below the magnetizing current Im. After resonant inductor current falls below Im, resonant capacitor begins to discharge through the secondary winding 44 to the Load.

FIG. 10C (time period C) Switch Q2 is ON, and switches Q1 and Q3 are OFF. Resonant capacitor continues to discharge, and provides energy to the load and to clamping capacitor Cc as it discharges. This causes a current pulse through the clamping capacitor.

FIG. 10D (time period D) Switches Q2 and Q3 are ON, and switch Q1 is OFF. Synchronous switch Q3 is turned ON when resonant capacitor voltage $V_{Cr}$ reaches zero. Voltage on the clamping capacitor causes a reverse current flow through the resonant inductor Lr. FIG. 10D illustrates the current flow in the latter portion of time period D, after current flow through Cc has reversed.

The magnetizing current Im in general is given by $$I_o\left(\frac{V_o}{V_{in}} + \frac{N_s}{N_p}\right),$$

where Io is the output current (Load current), Vo is the output voltage, Vin is the input voltage, Ns is the numbers of turns in the secondary winding 44, and Np is the number of turns in the primary winding 42.

It is noted that the combined duration of time periods B and C (equal to the OFF time of the synchronous switch Q3) is preferably approximately $$\frac{3}{2}\pi \frac{N_s}{N_p}\sqrt{(L+L_k)C}$$

where L is the inductance of the resonant inductor Lr, $L_k$ is the leakage inductance of the transformer, C is the capacitance of the resonant capacitor Cr, $N_s$ is the number of turns in the secondary winding 44, and $N_p$ is the number of turns in the primary winding 42. Hence, for a given circuit with fixed values of L, $L_k$, $N_s$, $N_p$ and C, the duration of the combined periods B and C is fixed. Fixing the duration of the combined B and C time periods assures that the voltage on the resonant capacitor is zero, or near-zero when synchronous switch Q3 is turned on (i.e. switch Q3 has zero voltage switching, or ZVS). Preferably, the leakage inductance $L_k$ is as small as possible.

In the transformer-isolated embodiment of FIG. 8, all switches Q1 Q2 and A3 have ZVS and near-ZCS. That is, switch current is zero or nearly zero at turn-off, and switch voltage is zero or nearly zero at turn-on.

It is noted that the voltage on the clamping capacitor Cc is nearly constant. As in the case of the quasi-resonant tap-buck, the clamping capacitor should have as large a capacitance as practical.

The output power can be controlled in the circuit of FIG. 8 by changing the time of transition T4 (Q2 turnoff and Q1 turn on) relative to the time of transition T1 (i.e. changing the duration of period A, when both Q1 and Q3 are ON). Specifically, the output power is increased as the duration of time period A is increased.

The ratio of output voltage to input voltage (Vo/Vin) can be adjusted in the transformer-isolated embodiment by varying the combined duration of time periods A and B. Increasing the combined duration A+B will increase the ratio of Vo/Vin. For a fixed input voltage, output voltage can be increased by increasing the combined duration of periods A and B.

The transformer-isolated circuit of FIG. 8 can have a relatively high duty cycle compared to the quasi-resonant buck circuit of FIG. 2 if the transformer has a turns ratio of greater than 1 (i.e. if the primary winding 42 has more turns than the secondary winding 44). This is because such a transformer will tend to reduce the output voltage. For example, if the primary/secondary (Np:Ns) turns ratio is 2:1, then the output voltage will be reduced by about 50%. A 2:1 turns ratio will allow the top switch Q1 to operate with 2-fold greater duty cycle than otherwise possible. This is beneficial because a greater duty cycle for Q1 tends to reduce the switching losses and increase power efficiency. The Np:Ns turns ratio of the transformer can be varied widely. A high turns ratio (e.g. 6:1, 8:1) tends to provide a low output voltage. Hence, in order to provide a low output voltage with 48V input, and high duty cycle for Q1, the turns ratio is preferably 6:1 or higher (e.g. 8:1 or 10:1).

It will be clear to one skilled in the art that the above embodiment may be altered in many ways without departing from the scope of the invention. Accordingly, the scope of the invention should be determined by the following claims and their legal equivalents.

What is claimed is:

1. A quasi-resonant buck converter comprising:
   a) a connection point;
   b) a top switch connected to a power source and to the connection point;
   c) an auxiliary switch connected to the connection point and to a return potential;
   d) a resonant inductor connected to the connection point and to an output inductor;
   e) a resonant capacitor connected to the return potential and to the resonant inductor, whereby the resonant inductor and resonant capacitor are connected in series across the auxiliary switch;
   f) a synchronous switch operated using zero voltage switching connected in parallel with the resonant capacitor.

2. The buck converter of claim 1, wherein the resonant inductor has an inductance value in the range of 1–10000 nH.

3. The buck converter of claim 1, wherein the resonant capacitor has a capacitance value in the range of 0.01–100 $\mu$F.

4. The buck converter of claim 1, wherein the quantity $$\frac{3}{2}\pi\sqrt{LC}$$

is in the range of 0.05 to 5 microseconds, where L is the inductance of the resonant inductor, and C is the capacitance of the resonant capacitor.

5. The buck converter of claim 1, further comprising a switch controller for controlling the synchronous switch, wherein the switch controller can phase shift the operation of the synchronous switch to control output power.

6. The buck converter of claim 1, further comprising a switch controller for controlling the synchronous switch, and wherein the switch controller operates the synchronous switch so that an ON time of the synchronous switch is equal to an OFF time of the synchronous switch.

7. The buck converter of claim 1, further comprising a switch controller, and wherein the switch controller operates the synchronous switch so that an OFF time of the synchronous switch is approximately equal to $$\frac{3}{2}\pi\sqrt{LC},$$

where L is the inductance of the resonant inductor, and C is the capacitance of the resonant capacitor.

8. A quasi-resonant tap-buck converter comprising:
   a) a connection point;
   b) a top switch connected to a power source and to the connection point;
   c) an auxiliary switch connected to a return potential;
   d) a clamping capacitor connected to the auxiliary switch and to the connection point;
   e) a resonant inductor connected to the connection point;
   f) primary and secondary coupled inductors connected in series with a parallel polarity, with the primary inductor connected to the resonant inductor;
   g) a resonant capacitor connected between the return potential and a midpoint of the coupled inductors;
   h) a synchronous switch operated using zero voltage switching connected in parallel with the resonant capacitor.

9. The tap-buck converter of claim 8, wherein the primary coupled inductor has an inductance value in the range of 1–10000 nH.

10. The tap-buck converter of claim 8, wherein the resonant capacitor has a capacitance value in the range of 0.01–100 mF.

11. The tap-buck converter of claim 8, wherein the quantity $$\frac{3}{2}\pi\sqrt{(L+L_k)C}$$

is in the range of 0.05 to 5 microseconds, where L is the inductance of the resonant inductor, Lk is the leakage inductance of the primary coupled inductor, and C is the capacitance of the resonant capacitor.

12. The tap-buck converter of claim 8, further comprising a switch controller that can vary the duration of a time period A and thereby control an output power.

13. The tap-buck converter of claim 8, further comprising a switch controller that can vary the combined duration of a time periods A and B and thereby control an output voltage.

14. The tap-buck converter of claim 8, further comprising a switch controller that controls the circuit such that an OFF time for the synchronous switch is approximately equal to $$\frac{3}{2}\pi\sqrt{(L+L_k)C},$$

where L is the inductance of the resonant inductor, Lk is the leakage inductance of the primary coupled inductor, and C is the capacitance of the resonant capacitor.

15. A quasi-resonant isolated converter comprising:
   a) a connection point;
   b) a top switch connected to a power source and to the connection point;
   c) a auxiliary switch connected to a return potential;
   d) a clamping capacitor connected to the auxiliary switch and to the connection point;
   e) a resonant inductor connected to the connection point;
   f) a transformer with a primary winding connected between the resonant inductor and the return potential, and with a secondary winding;
   g) a synchronous switch operated using zero voltage switching connected in series with the secondary winding;
   h) a resonant capacitor connected in parallel with the synchronous switch.

16. The isolated converter of claim 15, wherein the resonant inductor has an inductance value in the range of 1–10000 nH.

17. The isolated converter of claim 15, wherein the resonant capacitor has a capacitance value in the range of 0.01–100 mF.

18. The isolated converter of claim 15, wherein the quantity $$\frac{3}{2}\pi \frac{N_s}{N_p} \sqrt{(L+L_k)C},$$

is in the range of 0.05 to 5 microseconds, where L is the inductance of the resonant inductor, Lk is the leakage inductance of the transformer, C is the capacitance of the resonant capacitor, $N_s$ is the number of turns in the secondary winding, and $N_p$ is the number of turns in the primary winding.

19. The isolated converter of claim 15, further comprising a switch controller that can vary the duration of a time period A and thereby control the output power.

20. The isolated converter of claim 15, further comprising a switch controller that can vary the combined duration of a time periods A and B and thereby control the output voltage.

21. The isolated converter of claim 15, further comprising a switch controller that controls the circuit such that an OFF time for the synchronous switch is approximately equal to $$\left(\frac{3}{2}\right)\left(\pi\right)\left(\frac{N_s}{N_p}\right)\sqrt{(L+Lk)C},$$

where L is the inductance of the resonant inductor, Lk is the leakage inductance of the transformer, C is the capacitance of the resonant capacitor, $N_s$ is the number of turns in the secondary winding, and $N_p$ is the number of turns in the primary winding.

22. The isolated converter of claim 15 wherein the transformer has a $N_p/N_s$ turns ratio of at least 4:1.

23. The buck converter of claim 1 wherein there is not a diode in series with the resonant inductor.

24. The tap-buck converter of claim 8 wherein there is not a diode in series with the resonant inductor.

25. The isolated converter of claim 15 wherein there is not a diode in series with the resonant inductor.

26. A quasi-resonant power converter comprising
an output inductance,
an auxiliary inductance,
a capacitor, said capacitor being resonant with said auxiliary inductance,
a first switch for switching current from a voltage source to cause increasing current in said auxiliary inductance,
a second switch for providing freewheeling current to said auxiliary inductance,
a third switch for providing freewheeling current to said output inductance, and
means for controlling said first, second and third switches such that said first, second and third switches are switched between conductive and non-conductive states at times when a voltage across each of said first, second and third switches is substantially zero volts.

27. A quasi-resonant power converter as recited in claim 26, wherein said means for controlling said first, second and third switches provides near-zero current switching from a conductive state to a non-conductive state of said second and third switches.

28. A quasi-resonant power converter as recited in claim 26, wherein said means for controlling said first, second and third switches provides switching from a conductive state to a non-conductive state of said second and third switches when current through said second and third switches is between 5% and 20% of output current from said quasi-resonant power converter.

29. A quasi-resonant power converter as recited in claim 26, wherein said first and second switches are bi-directional current devices.

30. A quasi-resonant power converter as recited in claim 26, wherein said quasi-resonant power converter is a quasi-resonant buck converter.

31. A quasi-resonant power converter as recited in claim 26, wherein said quasi-resonant power converter is a quasi-resonant tap-buck converter.

32. A quasi-resonant power converter as recited in claim 26, wherein said quasi-resonant power converter is a quasi-resonant isolated converter.

33. A quasi-resonant power converter as recited in claim 27, wherein said quasi-resonant power converter is a quasi-resonant buck converter.

34. A quasi-resonant power converter as recited in claim 27, wherein said quasi-resonant power converter is a quasi-resonant tap-buck converter.

35. A quasi-resonant power converter as recited in claim 27, wherein said quasi-resonant power converter is a quasi-resonant isolated converter.

36. A quasi-resonant power converter as recited in claim 26 comprising
a parallel-connected combination of a switch and a capacitor wherein said capacitor is resonant with said auxiliary inductance and said switch includes a body diode and is operated using zero voltage switching.

* * * * *

UNITED STATES PATENT AND TRADEMARK OFFICE
CERTIFICATE OF CORRECTION

PATENT NO.        : 6,989,997 B2  
APPLICATION NO. : 10/603097  
DATED             : January 24, 2006  
INVENTOR(S)       : Xu et al.

Page 1 of 1

It is certified that error appears in the above-identified patent and that said Letters Patent is hereby corrected as shown below:

Title page, item [75] Inventors: add "Yang Qiu, Blacksburg, VA (US)"

Signed and Sealed this

Twenty-fifth Day of July, 2006

JON W. DUDAS  
*Director of the United States Patent and Trademark Office*